US 7,681,231 B2

(12) United States Patent
Combs et al.

(10) Patent No.: US 7,681,231 B2
(45) Date of Patent: Mar. 16, 2010

(54) METHOD TO WIRELESSLY CONFIGURE A WIRELESS DEVICE FOR WIRELESS COMMUNICATION OVER A SECURE WIRELESS NETWORK

(75) Inventors: Harold R. Combs, Georgetown, KY (US); David T. Jarvis, Richmond, KY (US); David Z. Lindsey, Paris, KY (US); Jason E. Waldeck, Lexington, KY (US); William T. Warner, III, Lexington, KY (US); Jeffrey J Watrous, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1225 days.

(21) Appl. No.: 11/150,376

(22) Filed: Jun. 10, 2005

(65) Prior Publication Data
US 2006/0282885 A1 Dec. 14, 2006

(51) Int. Cl.
G06F 17/30 (2006.01)
(52) U.S. Cl. .................................... 726/5; 726/4; 726/3
(58) Field of Classification Search .................. 726/5, 726/4, 3
See application file for complete search history.

(56) References Cited

U.S. PATENT DOCUMENTS

| 5,488,631 | A | 1/1996 | Gold et al. |
| 5,913,034 | A | 6/1999 | Malcolm |
| 6,360,257 | B1 | 3/2002 | Rydberg et al. |
| 6,587,450 | B1 | 7/2003 | Pasanen |
| 6,658,475 | B1 | 12/2003 | Ueno |
| 6,661,784 | B1 | 12/2003 | Nykänen |
| 6,684,324 | B2 | 1/2004 | Floman et al. |
| 6,691,227 | B1 | 2/2004 | Neves et al. |
| 6,732,195 | B1 | 5/2004 | Baldwin |
| 6,772,338 | B1 | 8/2004 | Hull |
| 6,810,436 | B2 | 10/2004 | Wu et al. |
| 6,820,119 | B1 | 11/2004 | Omizo |

OTHER PUBLICATIONS

Windows Wireless Configuration; from cws.internet.com, as printed out in 2008.*
Intel Centrino Processor Technology; from www.intel.com, as printed out in 2008.*
MarkVision Professional; from www.lexmark.com, as printed out in 2008.*
Wireless Network Security Policy Based on Integrated Vulnerability Management; Gu Yue-sheng; Zhang Bao-jian; Yu Zhou; Networking and Digital Society, 2009. ICNDS '09. International Conference on vol. 2, May 30-31, 2009 pp. 225-228.*
SNMP-based Integrated Wire/wireless Device Management System; Soo-Jin Jung; Jong-Hyouk Lee; Young-Ju Han; Jong-Hyun Kim; Jung-Chan Na; Tai-Myoung Chung; Advanced Communication Technology, The 9th International Conference on vol. 2, Feb. 12-14, 2007 pp. 995-998.*

* cited by examiner

Primary Examiner—David Y Jung

(57) ABSTRACT

A method to wirelessly configure a wireless device for wireless communication over a secure wireless network includes placing the wireless device to be configured for communication over the secure wireless network within a wireless communication range of an administrator; establishing a secure wireless communication channel between the administrator and the wireless device; and providing to the wireless device via the secure wireless communication channel network credentials needed to communicate over the secure wireless network.

23 Claims, 5 Drawing Sheets

METHOD TO WIRELESSLY CONFIGURE A WIRELESS DEVICE FOR WIRELESS COMMUNICATION OVER A SECURE WIRELESS NETWORK

BACKGROUND OF THE INVENTION

1. Field of the Invention

The present invention relates to wireless communication, and, more particularly, to a method to wirelessly configure a wireless device for wireless communication over a secure wireless network.

2. Description of the Related Art

Wireless network connections between devices are rapidly replacing wired connections due to the simplicity and flexibility of using wireless connections. Setting up and configuring devices with wireless connections can be more difficult than with wired connections, however, due primarily to the increased security considerations necessary with wireless networks. Some methods of configuration require an additional wired connection with the wireless device. Additionally, each device must be configured individually, rather than being able to configure several devices at once.

What is needed in the art is a method of setting up one or more wirelessly connected devices, quickly, easily and securely.

SUMMARY OF THE INVENTION

The present invention provides a method of setting up one or more wirelessly connected devices, quickly, easily and securely.

The invention, in one exemplary embodiment, is directed to a method to wirelessly configure a wireless device for wireless communication over a secure wireless network, including placing the wireless device to be configured for communication over the secure wireless network within a wireless communication range of an administrator; establishing a secure wireless communication channel between the administrator and the wireless device; and providing to the wireless device via the secure wireless communication channel the network credentials needed to communicate over the secure wireless network.

The invention, in another exemplary embodiment, is directed to a method to wirelessly configure a wireless device, having a preset identifier and set to operate in an ad hoc communications mode, for wireless communication over a secure wireless network, including; positioning the wireless device within a wireless range of an administrator device; establishing a secure wireless communication channel between the administrator device and the wireless device; and executing an administration utility on the administrator device to configure, via the secure wireless communication channel, the wireless device to use the secure wireless network.

The invention, in another exemplary embodiment, is directed to a method to wirelessly configure a wireless device, having a preset identifier and set to operate in an infrastructure communications mode for wireless communication over a secure wireless network, including establishing an insecure network to communicate with the wireless device using the preset identifier; establishing communications between an administrator device and the wireless device via the insecure network; establishing a secure wireless communication channel between the administrator device and the wireless device; and configuring the wireless device to use the secure wireless network using an administration utility on the administrator device via the secure wireless communication channel.

BRIEF DESCRIPTION OF THE DRAWINGS

The above-mentioned and other features and advantages of the present invention, and the manner of attaining them, will become more apparent, and the present invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the present invention, and such exemplifications are not to be construed as limiting the scope of the invention in any manner.

DETAILED DESCRIPTION OF THE INVENTION

Figure 1:
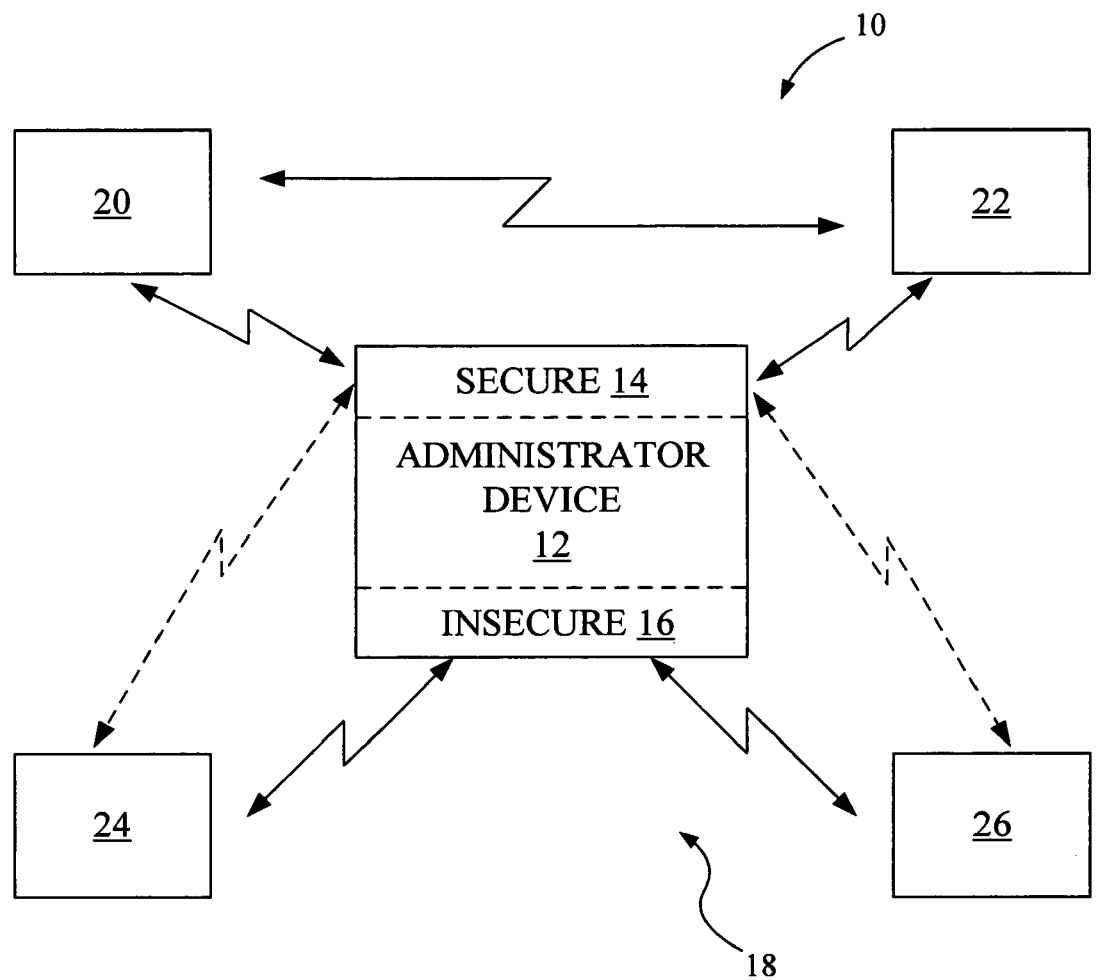
FIG. 1 is a diagrammatic depiction of a wireless network operating in an ad hoc communications mode

Referring now to the drawings and particularly to FIG. 1, there is shown a secure wireless network 10 operating in an ad hoc communications mode. Secure wireless network 10 includes an administrator device 12, such as a personal computer, executing an administration utility, such as MarkVision Professional™, which is available from Lexmark International, Inc. For example, MarkVision Professional™ is an administration utility used to configure devices, such as printers and all-in-one (AIO) machines that may perform other functions such as scanning and faxing in addition to printing.

Administrator device 12 includes a secure link 14 facilitating wireless communication of administrator device 12 over secure wireless network 10 and an insecure link 16 facilitating wireless communication of administrator device 12 over an insecure wireless network 18.

As shown in the example of FIG. 1, Device 20 and device 22 have established secure wireless communication with secure wireless network 10, as indicated by solid double-headed arrows. Wireless devices 24 and 26 are in communication with administrator device 12 via insecure wireless network 18, as indicated by the solid double-headed arrows. However, wireless devices 24 and 26 desire to join secure wireless network 10, as indicated by the dashed double-headed arrows. Once secure communications between secure wireless network 10 and wireless devices 24 and 26 are established, the insecure communication between each of device 24 and device 26 with administrator device 12 via insecure wireless network 18 may be terminated.

The ad hoc communications mode is a feature of the IEEE 802.11 standard. The ad hoc communications mode allows the radio network interface card (NIC) of the device to operate in what the IEEE 802.11 standard refers to as an independent basic service set (IBSS) network configuration. In an IBSS configuration, devices communicate directly with each other without an intermediary, e.g., without an access point device.

Figure 2:
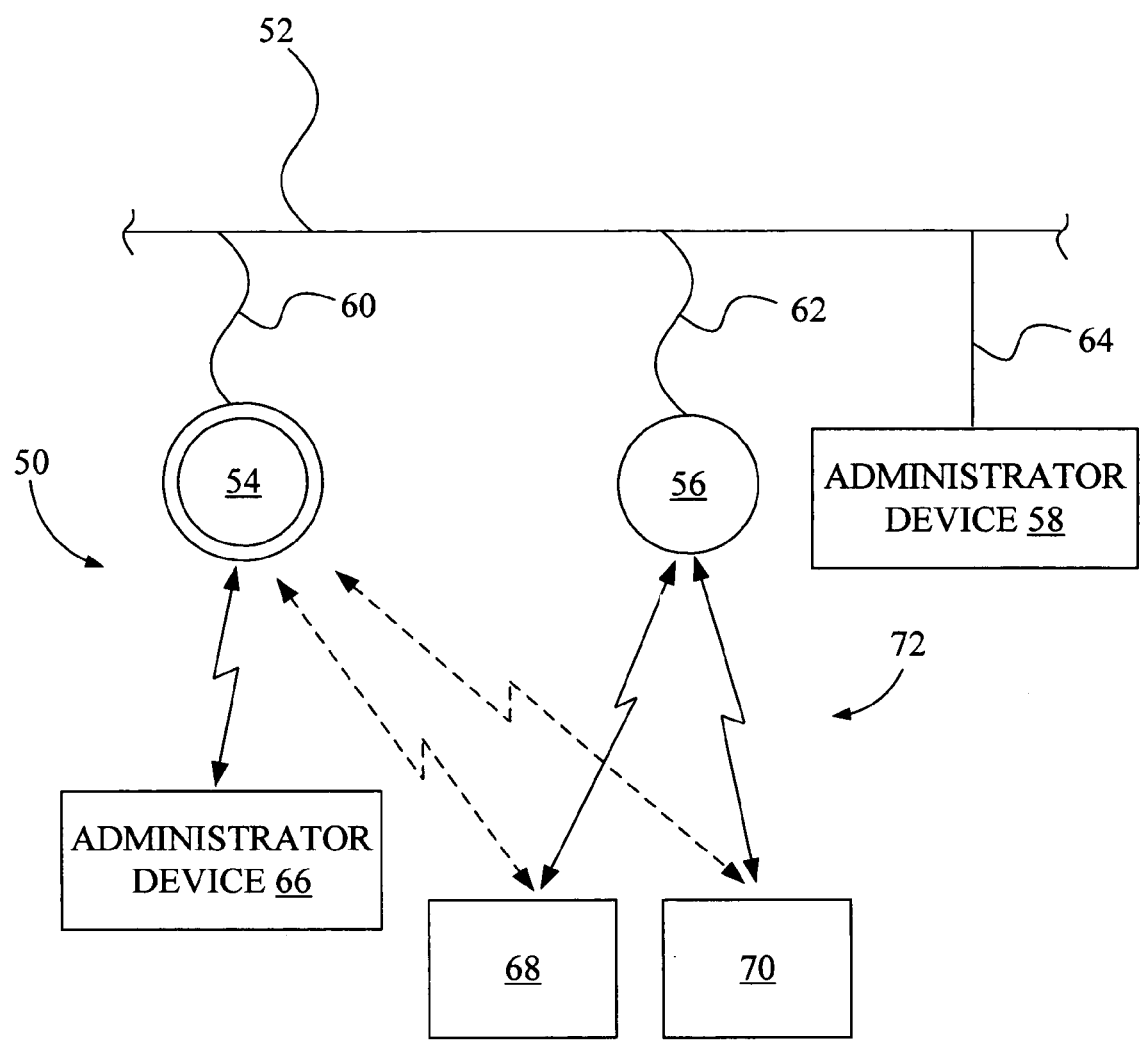
FIG. 2 is a diagrammatic depiction of a wireless network operating in an infrastructure communications mode.

In contrast to secure wireless network 10 of FIG. 1, in FIG. 2 there is shown a secure wireless network 50 operating in an infrastructure communications mode. In the infrastructure communications mode, wireless devices can communicate with each other only through intermediary access points. In the example shown in FIG. 2, communication over secure wireless network 50 may be achieved through both wired and wireless communications. For example, secure wireless network 50 is connected to a network 52, such as a local area network, via access point device 54. Device 54, device 56, and administrator device 58 are connected to network 52 via respective communication landlines or wired connections 60, 62, and 64.

In the embodiment of FIG. 2, device 54 provides a secure wireless access point, as indicated by double circles, through which communication with the broader secure wireless network 50 is enabled. An administrator device 66 is in communication with secure access point device 54 via secure wireless network 50, as indicated by the solid double-headed arrow. In this embodiment, administrator device 66 executes an administration utility, such as MarkVision Professional TM, which is used to add devices to secure wireless network 50. Similarly, administrator device 58 may be used to add devices to secure wireless network 50.

Device 56 provides an insecure wireless access point, as indicated by a single circle, which may be used for purposes of establishing communications with devices wishing to gain access to secure wireless network 50. For example, wireless device 68 and wireless device 70 communicate with the insecure access point device 56 via an insecure wireless network 72, as indicated by solid double-headed arrows. However, wireless device 68 and wireless device 70 desire to join secure wireless network 50, as indicated by the dashed double-headed arrows. Once secure communications between secure wireless network 50 and wireless devices 68 and 70 is established, the insecure communication between each of wireless device 68 and wireless device 70 with insecure access point device 56 may be terminated.

Figure 3:
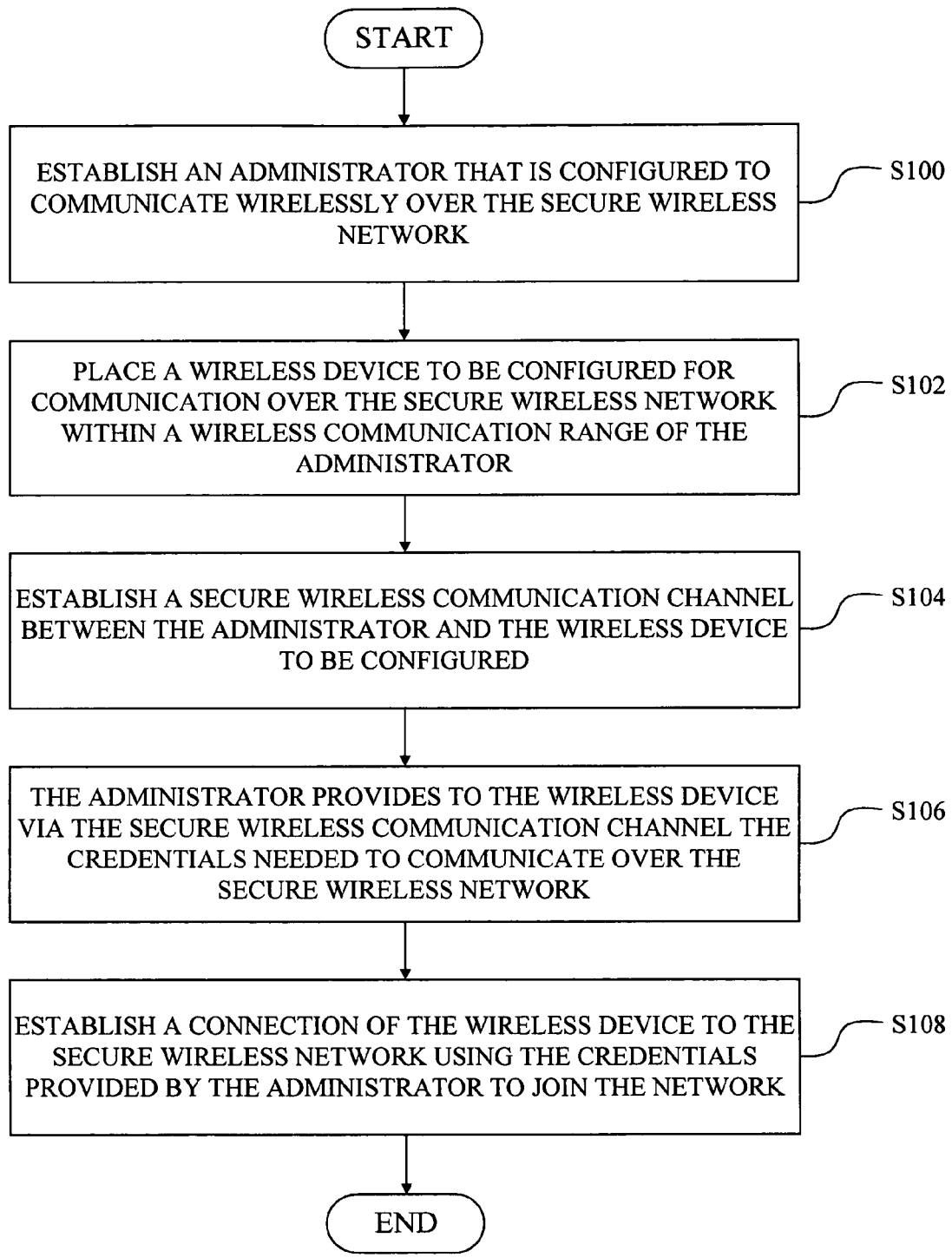
FIG. 3 is a flowchart of a general method in accordance with the present invention to wirelessly configure a wireless device to be connected for wireless communication over the secure wireless network of FIG. 1 and/or FIG. 2.

FIG. 3 is a flowchart of a general method in accordance with the present invention to wirelessly configure a wireless device to be connected for wireless communication over a secure wireless network, which may be applied to each of the embodiments described above with respect to FIGS. 1 and 2.

At step S100, an administrator is established that is configured to communicate wirelessly over the secure wireless network. The administrator executes an administration utility for configuring wireless devices to be connected to the secure wireless network. For example, in the embodiment of FIG. 1, wherein secure wireless network 10 is operating in an ad hoc communications mode, device 12 was selected as the administrator device. In the embodiment of FIG. 2, wherein secure wireless network 50 is operating in an infrastructure mode, device 66 may be selected as the administrator device.

At step S102, a wireless device to be configured for communication over the secure wireless network is placed within a wireless communication range of the administrator. In the embodiment of FIG. 1, wireless devices 24 26 are placed within a wireless communication range of administrator device 12. In the embodiment of FIG. 2, wireless device 68 and wireless device 70 are placed within a wireless communication range of any access point allowing communications with administrator device 66, such as for example, insecure access point device 56.

At step S104, a secure wireless communication channel is established between the administrator and the wireless device to be configured. In the embodiment of FIG. 1, one way of accomplishing the secure wireless communication channel is to have each of the wireless devices 24 and 26 manufactured with credentials used for establishing the secure wireless communication channel, thereby allowing the secure wireless communication channel to be set up by administrator device 12 over the insecure network 18. In the embodiment of FIG. 2, one way of accomplishing the secure wireless communication channel is to have wireless devices 68 and 70 manufactured or associated with channel credentials used for establishing the secure wireless communication channel, thereby allowing the secure wireless communication channel to be set up by administrator device 66 or administrator device 58. In either embodiment, the credentials to set up the secure channel may be, for example, one or more of a digital key, a certificate, and a user name and password.

Configuration of a wireless device to join and securely communicate with a wireless network involves sending credentials other than channel credentials (i.e., network credentials) that the device needs to join the secure network. By establishing the secure wireless communication channel between the administrator device and the device to be configured, the hazard of leaking the information, i.e., network credentials, needed to join the network is reduced. Like the channel credentials needed to establish the secure communications channel, the network credentials needed to communicate over the secure wireless network may be, for example, one or more of a digital key, a certificate, and a user name and password.

At step S106, the administrator provides to the wireless device via the secure wireless communication channel established in step S104 the network credentials needed to communicate over the secure wireless network, e.g., secure wireless network 10 in FIG. 1 or secure wireless network 50 in FIG. 2. As mentioned above, the network credentials may be in the form of a key, such as a Wired Equivalency Protocol key and a Wi-Fi Protected Access key. The credentials may also be in the form of a certificate, such as an 802.1x certificate. Once the network credentials are received, the device is considered to be configured for communications over the secure wireless network. Other forms of such network credentials include an identifier, such as for example, a Service Set Identifier (SSID). The SSID uniquely names a wireless local area network (WLAN) and is especially useful when several networks operate in the same physical area or location.

At step S108, a connection between the wireless device and the secure wireless network is established using the network credentials provided by the administrator at step S106 to join the network.

In the embodiment of FIG. 1, wherein wireless devices 24 and 26 are initially in an ad hoc communications mode, once configured, wireless devices 24 and 26 may continue to operate in the ad hoc communications mode. Alternatively, in some embodiments, wherein wireless devices 24 and 26 are initially in an ad hoc communications mode, once configured, wireless devices 24 and 26 may operate in a different communications mode, such as the infrastructure communications mode.

In the embodiment of FIG. 2, wherein wireless devices 68 and 70 are initially communicating via insecure access point device 56 in an infrastructure communications mode, once configured, wireless devices 68 and 70 continue to operate in the infrastructure communications mode using the secure access point device 54. Alternatively, in some embodiments, wherein wireless devices 68 and 70 are initially in the infrastructure communications mode, once configured, wireless devices 68 and 70 may operate in the ad hoc communications mode.

In addition to the network credentials provided by the administrator device, each device on the network has a unique identifier, such as for example, an Internet Protocol (IP) addresses, used to communicate over the secure network. Some devices require an IP address to be set manually while other devices query a Dynamic Host Configuration Protocol (DHCP) server to acquire an IP address. Other devices may be able to self-select an IP address so that their IP addresses do not conflict with the address of another device.

Figure 4:
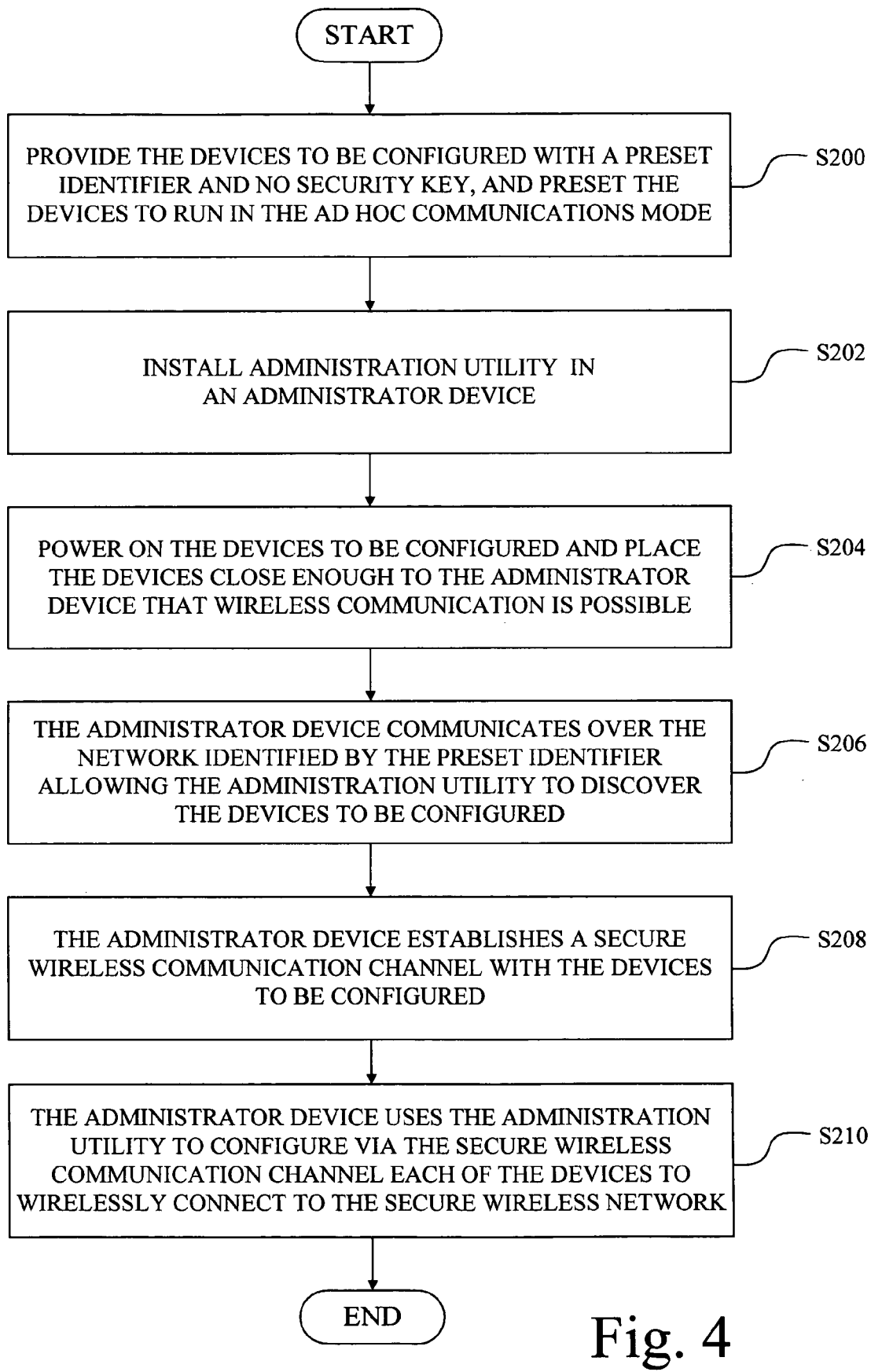
FIG. 4 is a flowchart of a method in accordance with the present invention to wirelessly configure using ad hoc communication techniques a wireless device to be connected for wireless communication over a secure wireless network.

FIG. 4 is a flowchart of a method in accordance with the present invention to wirelessly configure using ad hoc communication techniques a wireless device to be connected for wireless communication over a secure wireless network, such as secure wireless network 10 of FIG. 1 operating in the ad hoc communications mode.

At step S200, the wireless devices 24 and 26, which are to be configured for wireless communication over a secure wireless network, are manufactured or associated with a preset identifier (e.g., SSID) and no security key. Also, wireless devices 24 and 26 are preset or have a default setting to operate in the ad hoc communications mode.

At step S202, an administration utility, such as the MarkVision Professional TM printer utility, is installed in administrator device 12, which is selected as the device for performing the configuration of devices, e.g., wireless devices 24 and 26, that desire to join secure wireless network 10. In an alternate embodiment, the administration utility is preloaded or preinstalled in the administrator device. Administrator device 12 has the ability of communicating wirelessly over both an insecure wireless network and a secure wireless network. Each of wireless devices 24 and 26 may be, for example, a printer or an all-in-one machine and are initially communicated with via insecure. wireless network 18.

At step S204, wireless devices 24 and 26 are powered on and placed or positioned close enough to the configuring device, i.e., administrator device 12, that wireless communications between administrator device 12 and wireless devices 24 and 26 are possible. Wireless devices 24 and 26 will configure their own IP addresses so that communication over the network is possible.

At step S206, administrator device 12 communicates over the network identified by the preset identifier (e.g., SSID), of wireless devices 24 and 26, thereby allowing the administration utility to discover wireless devices 24 and 26.

At step S208, administrator device 12 establishes a secure wireless communication channel with wireless devices 24 and 26 using insecure network 18. One way of accomplishing the secure wireless communication channel is to have each of the devices 24 and 26 manufactured or associated with channel credentials used for establishing the secure wireless communication channel, which thereby allows the secure channel to be set up by administrator device 12.

At step S210, administrator device 12 uses the administration utility to configure via the secure wireless communication channel each of wireless devices 24 and 26 to wirelessly connect to secure wireless network 10. The configuring may be, for example, by providing to the wireless devices 24 and 26 via the secure wireless communication channel the network credentials needed to communicate over secure wireless network 10.

In the embodiment of FIG. 1, wherein wireless devices 24 and 26 are initially in an ad hoc communications mode, once configured, wireless devices 24 and 26 may continue to operate in the ad hoc communications mode. Alternatively, in some embodiments, wherein wireless devices 24 and 26 are initially in an ad hoc communications mode, once configured, wireless devices 24 and 26 may no longer operate in another communications mode, such as the infrastructure communications mode, rather than in the ad hoc communications mode.

Figure 5:
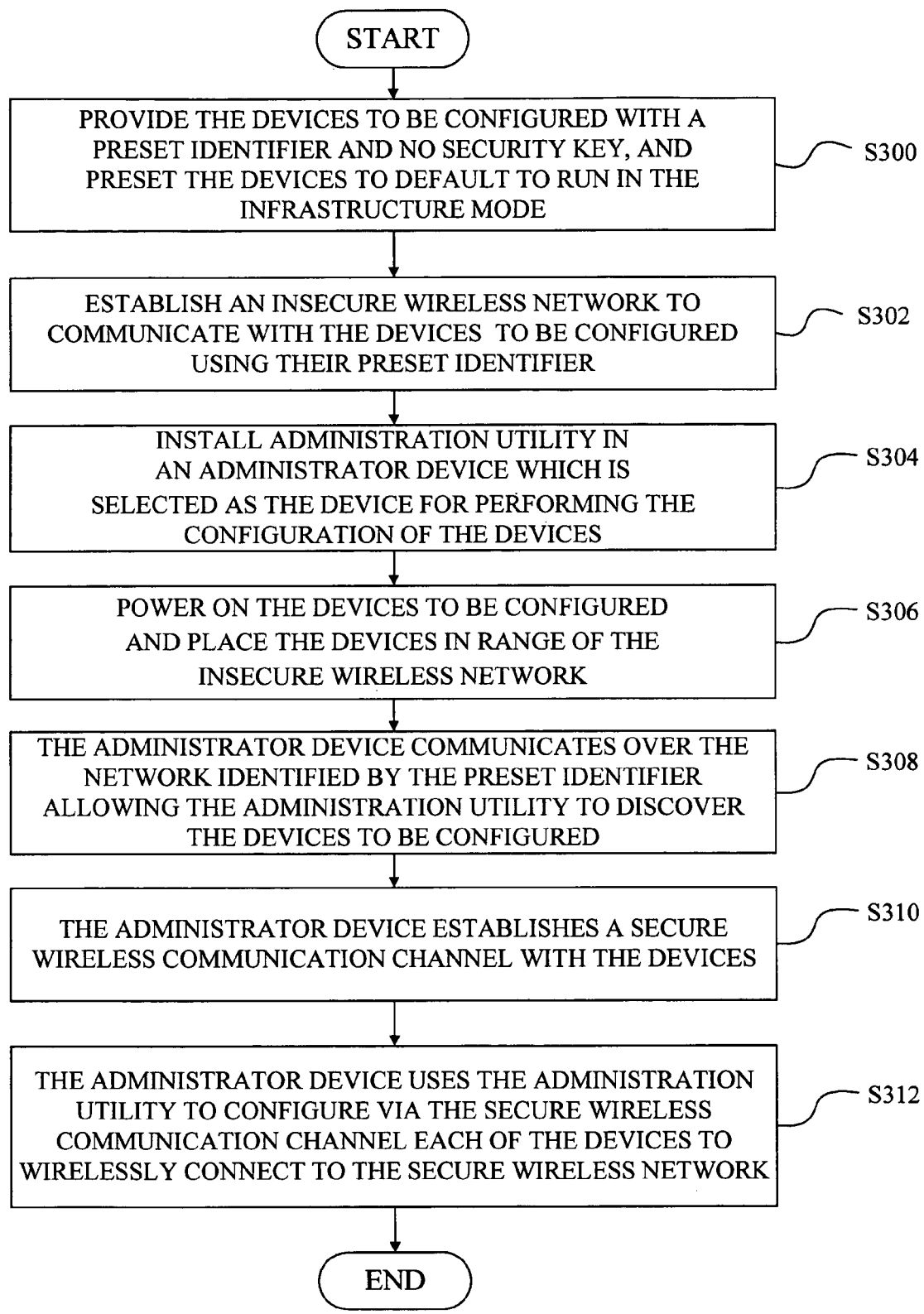
FIG. 5 is a flowchart of a method in accordance with the present invention to wirelessly configure using infrastructure communications techniques a wireless device to be connected for wireless communication over a secure wireless network.

FIG. 5 is a flowchart of a method in accordance with the present invention to wirelessly configure using infrastructure communications techniques a wireless device to be connected for wireless communication over a secure wireless network, such as secure wireless network 50 of FIG. 2 operating in an infrastructure mode.

At step S300, wireless devices 68 and 70, which are to be configured for wireless communication over a secure wireless network, are manufactured or associated with a preset identifier (e.g. SSID) and no security key. Wireless devices 68 and 70 are also preset or have a default setting to operate in the infrastructure communications mode.

At step S302, an insecure wireless network 72 is established to communicate with wireless devices 68 and 70 using their preset identifier.

At step S304, if not already pre-installed, an administration utility, such as the MarkVision Professional TM printer utility, is installed in administrator device 66, which is selected as the device for performing the configuration of devices, e.g., wireless devices 68 and 70, that desire to join secure wireless network 50. Each of wireless devices 68 and 70 may be, for example, a printer or an all-in-one machine.

At step S306, wireless devices 68 and 70 are powered on and placed or positioned in range of the insecure wireless network 72. Wireless devices 68 and 70 also configure their own IP addresses so that communication over the network is possible.

At step S308, administrator device 66 communicates over the network identified by the preset identifier (e.g., SSID) of wireless devices 68 and 70, thereby allowing the administration utility to discover wireless devices 68 and 70.

At step S310, administrator device 66 establishes a secure wireless communication channel with wireless devices 68 and 70. The secure wireless communications channel may be established, for example, via secure access point device 54, network 52, and insecure access point device 56. One way of accomplishing the secure wireless communication channel is to have each of the wireless devices 68 and 70 manufactured or associated with channel credentials used for establishing the secure wireless communication channel, which allows the secure channel to be set up by administrator device 66.

In the embodiment of FIG. 2, wherein wireless devices 68 and 70 are initially in an infrastructure communications mode, once configured, wireless devices 68 and 70 continue to operate in the infrastructure communications mode. Alternatively, in some embodiments, wherein wireless devices 68 and 70 are initially in the infrastructure communications mode, once configured, wireless devices 68 and 70 may operate in a different communications mode, such as the ad hoc communications mode.

At step S312, administrator device 66 uses the administration utility to configure via the secure wireless communication channel each of wireless devices 68 and 70 wirelessly connect to secure wireless network 50. The configuring may be, for example, by providing to the wireless devices 68 and 70 via the secure wireless communication channel the network credentials needed to communicate over secure wireless network 50.

An advantage of using infrastructure communication techniques in configuring a device is that the configuring device (e.g., administrator device 66 or administrator device 58), and the wireless devices 68 and 70, would not have to be in proximity to each other. The potential disadvantage, however, is the use of an insecure wireless network for configuration prior to establishing the secure communication channel.

Advantageously, the methods of the invention accommodate the simultaneous configuration of additional or multiple devices for communication over the secure wireless network of interest.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method to wirelessly configure a wireless device for wireless communication over a secure wireless network, comprising:
    placing said wireless device to be configured for communication over said secure wireless network within a wireless communication range of an administrator;
    establishing a secure wireless communication channel between said administrator and said wireless device;
    providing to said wireless device via said secure wireless communication channel network credentials needed to communicate over said secure wireless network; and
    using said credentials, establishing a connection between said wireless device and said secure wireless network for said wireless communication.

2. The method of claim 1, further comprising establishing a connection of said wireless device to said secure wireless network using said network credentials.

3. The method of claim 1, wherein said wireless device is initially in an ad hoc communications mode, and wherein once configured, said wireless device operates in a different communications mode.

4. The method of claim 1, wherein said wireless device is initially in an ad hoc communications mode, and wherein once configured, said wireless device operates in said ad hoc communications mode.

5. The method of claim 1, wherein said wireless device is initially in an infrastructure communications mode, and wherein once configured, said wireless device operates in an ad hoc communications mode.

6. The method of claim 1, wherein said wireless device is initially in an infrastructure communications mode, and wherein once configured, said wireless device operates in said infrastructure communications mode.

7. The method of claim 1, wherein said secure wireless communication channel is a point-to-point communication channel.

8. The method of claim 1, wherein said wireless device is manufactured with channel credentials used for establishing said secure wireless communication channel.

9. The method of claim 8, wherein said channel credentials include at least one of a key, a user name and password, and a certificate.

10. The method of claim 1, wherein said network credentials include at least one of a key, a user name and password, and a certificate.

11. The method of claim 10, wherein said key is one of a Wired Equivalency Protocol key and a Wi-Fi Protected Access key.

12. The method of claim 10, wherein said certificate is an 802.1x certificate.

13. The method of claim 1, wherein a second device is configured simultaneously for communication over said secure wireless network.

14. A method to wirelessly configure a wireless device, having a preset identifier and set to operate in an ad hoc communications mode, for wireless communication over a secure wireless network, comprising:
    positioning said wireless device within a wireless range of an administrator device;
    establishing a secure wireless communication channel between said administrator device and said wireless device; and
    executing an administration utility on said administrator device to configure, via said secure wireless communication channel, said wireless device to connect to said secure wireless network for said wireless communication.

15. The method of claim 14, wherein network credentials needed to communicate over said secure wireless network are provided to said wireless device via said secure wireless communication channel.

16. The method of claim 15, wherein said network credentials include at least one of a key, a user name and password, and a certificate.

17. The method of claim 14, wherein said wireless device is associated with channel credentials used for establishing said secure wireless communication channel.

18. The method of claim 17, wherein said channel credentials include at least one of a key, a user name and password, and a certificate.

19. The method of claim 14, wherein a second device is configured simultaneously for communication over said secure wireless network.

20. A method to wirelessly configure a wireless device, having a preset identifier and set to operate in an infrastructure communications mode, for wireless communication over a secure wireless network, comprising:
    establishing an insecure wireless network channel to communicate with said wireless device using said preset identifier;
    establishing communications between an administrator device and said wireless device via said insecure wireless network channel;
    establishing a secure wireless communication channel between said administrator device and said wireless device; and
    using an administration utility on said administrator device via said secure wireless communication channel for configuring said wireless device to connect to said secure wireless network for said wireless communication over said secure wireless network.

21. The method of claim 20, wherein network credentials needed to communicate over said secure wireless network are provided to said wireless device via said secure wireless communication channel.

22. The method of claim 20, wherein said wireless device is associated with channel credentials used for establishing said secure wireless communication channel.

23. The method of claim 20, wherein a second device is configured simultaneously for communication over said secure wireless network.

* * * * *